US007684070B2

(12) United States Patent  
Sakamoto

(10) Patent No.: US 7,684,070 B2
(45) Date of Patent: Mar. 23, 2010

(54) PRINTING SYSTEM, INFORMATION PROCESSING APPARATUS AND METHOD, AND COMPUTER PROGRAM AND COMPUTER-READABLE STORAGE MEDIUM

(75) Inventor: Yoichi Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1148 days.

(21) Appl. No.: 10/764,579

(22) Filed: Jan. 27, 2004

(65) Prior Publication Data

US 2004/0184079 A1 Sep. 23, 2004

(30) Foreign Application Priority Data

Jan. 30, 2003 (JP) ............... 2003-022268

(51) Int. Cl.
  *G06F 3/12* (2006.01)
  *H04N 1/46* (2006.01)
  *H04N 1/00* (2006.01)
  *G06K 15/00* (2006.01)
(52) U.S. Cl. ................. 358/1.15; 358/539; 358/426.05; 358/426.06; 358/426.12; 358/1.16
(58) Field of Classification Search .................. None
  See application file for complete search history.

(56) References Cited

U.S. PATENT DOCUMENTS 4,413,275 A * 11/1983 Horiuchi et al. ............. 358/502
5,533,175 A * 7/1996 Lung et al. ................. 358/1.16
5,949,445 A   9/1999 Aichi
6,151,457 A * 11/2000 Kawamoto ................... 399/9

FOREIGN PATENT DOCUMENTS

| JP | 63-091754 | 4/1988 |
| JP | 08-097986 | 4/1996 |
| JP | 08-181866 | 7/1996 |
| JP | 10-191085 | 7/1998 |
| JP | 10-257308 | 9/1998 |
| JP | 11-327823 | 11/1999 |
| JP | 3296226 | 4/2002 |
| JP | 2002-316444 | 10/2002 |

* cited by examiner

Primary Examiner—David K Moore
Assistant Examiner—Marcus T. Riley
(74) Attorney, Agent, or Firm—Fitzpatrick, Cella, Harper & Scinto

(57) ABSTRACT

Upon transmission of compressed code data for respective printing color components from an information processing apparatus such as a host computer to a printing apparatus, a reception buffer memory of the printing apparatus can be effectively utilized. For this purpose, a printer driver repetitively receives drawing data regarding printing from higher processing and performs drawing. When an end of page command has been received, the drawn image data is converted to printing color component data, and a ratio of data amounts for the respective printing color components is notified to the printing apparatus based on predicted code amounts upon compression of the image data for the respective printing color components, such that the printing apparatus determines ring buffer sizes of the reception buffer memory allocated for respective color components. Then, the code data for the respective printing color components is outputted.

9 Claims, 11 Drawing Sheets

FIG. 8

AREA ATTRIBUTE TABLE

| AREA POSITION | CHARACTER / LINE ART |
|---|---|
| ⋮ | |
| ⋮ | |
| EOT | |

FIG. 9

| IMAGE QUALITY 1 | |
|---|---|
| YELLOW DITHER MATRIX (CHARACTER/LINE ART) | A01 |
| YELLOW DITHER MATRIX (HALFTONE) | A02 |
| MAGENTA DITHER MATRIX (CHARACTER/LINE ART) | A03 |
| MAGENTA DITHER MATRIX (HALFTONE) | A04 |
| CYAN DITHER MATRIX (CHARACTER/LINE ART) | A05 |
| CYAN DITHER MATRIX (HALFTONE) | A06 |
| BLACK DITHER MATRIX (CHARACTER/LINE ART) | A07 |
| BLACK DITHER MATRIX (HALFTONE) | A08 |

(IMAGE QUALITY 2, ..., IMAGE QUALITY # shown as stacked tables behind IMAGE QUALITY 1)

PRINTING SYSTEM, INFORMATION PROCESSING APPARATUS AND METHOD, AND COMPUTER PROGRAM AND COMPUTER-READABLE STORAGE MEDIUM

FIELD OF THE INVENTION

The present invention relates to a technique of printing a color image.

BACKGROUND OF THE INVENTION

In printers which receive print data from a host computer and perform printing based on the received data, known is a technique of using a buffer memory for each printing color component as a ring buffer (for example, Japanese Patent No. 3296226).

According to this technique, as a ring buffer can be determined in correspondence with the information amount of each printing color component, the limited memory capacity can be effectively utilized.

Nowadays the printing resolution of printers is further increased, whereas an enormous amount of data is transferred from the host computer to the printers. To efficiently perform the transfer, the data amount may be reduced by compressing image data to be print-outputted. However, the information amounts of the respective color components are not in equal proportions. That is, the ring buffers for the respective printing color components cannot effectively function without difficulty.

SUMMARY OF THE INVENTION

The present invention has been made in consideration of the above problem, and provides a technique for effectively utilizing a reception buffer memory in transmission of compressed code data for respective printing color components from an information processing apparatus such as a host computer to a printing apparatus.

To solve the problem, a printing system of the present invention has the following construction. That is, provided is a printing system including an information processing apparatus which outputs print data and a printing apparatus which receives the print data from the information processing apparatus, wherein the information processing apparatus comprising:

generation means for generating image data for respective printing color components based on data to be print-outputted delivered from higher processing;

coding means for compress-encoding the image data for the respective printing color components generated by the generation means;

notification means for generating memory allocation ratio information based on a ratio of coded data amounts for the respective printing color components coded by the coding means and notifying the information to the printing apparatus; and output means for outputting the image data for the respective printing color components coded by the coding means to the printing apparatus, and wherein the printing apparatus comprising:

a reception buffer to temporarily store the image data for the respective printing color components outputted by the output means;

plural decoding means, independently provided for the respective printing color components, for decoding coded data to image data; and means for setting sizes of the reception buffer allocated for the respective printing color components, in accordance with the memory allocation ratio information.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is an example of an area attribute table generated by the printer driver;

FIG. 9 is an example of processing tables for respective modes of the printer driver according to the first embodiment;

DETAILED DESCRIPTION OF THE PREFERRED EMBODIMENTS

Preferred embodiments of the present invention will now be described in detail in accordance with the accompanying drawings.

First Embodiment

Figure 1:
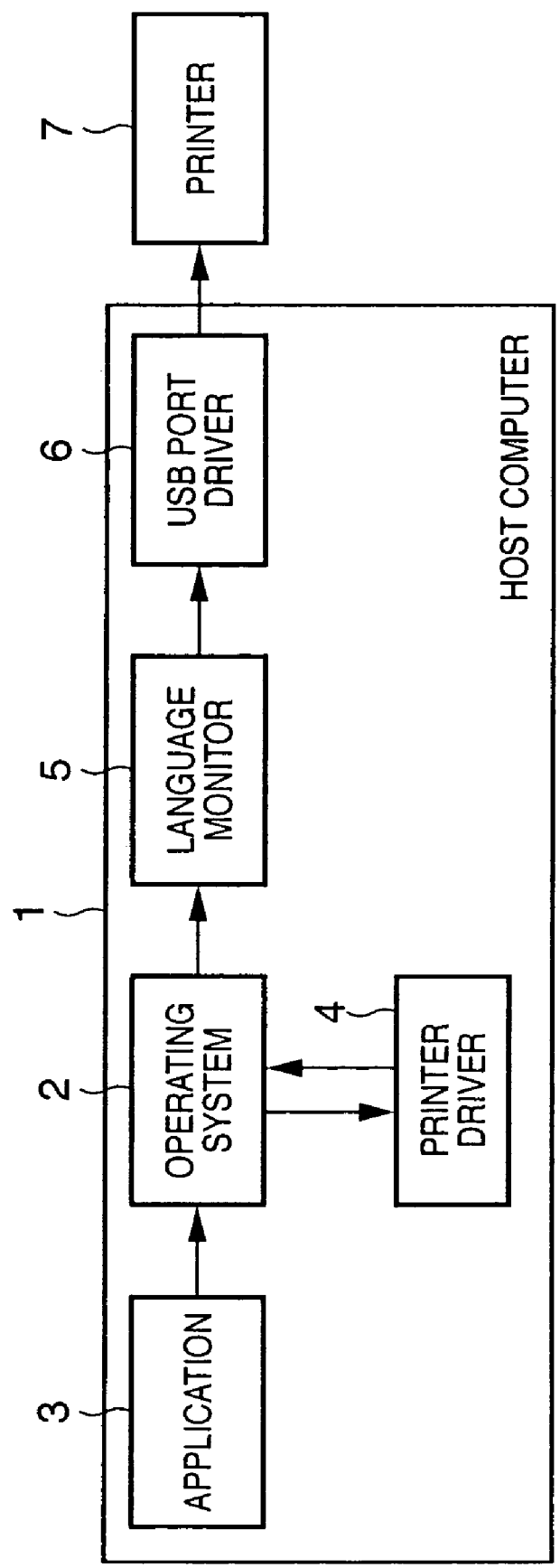
FIG. 1 is a block diagram showing a system configuration according to a first embodiment of the present invention.

FIG. 1 is a block diagram showing a system configuration according to a first embodiment of the present invention. In FIG. 1, reference numeral 1 denotes a general information processing apparatus (host computer) such as a personal computer as a print data generating source, having hardware such as a CPU, a memory, a hard disk, a floppy disk drive, a keyboard, a pointing device such as a mouse (registered trademark), a monitor, and a USB port (not shown).

Numeral 2 denotes an operating system (OS) which manages the hardware of the computer 1, and software such as an application 3, a printer driver 4, an language monitor 5 and a USB port driver 6. The application 3 is software such as a word processor which generates and prints a document in accordance with an operator's instruction. Numeral 4 denotes a printer driver which receives a printing command issued by the application 3 via the operating system 2, and converts the printing command to a printer command interpretable for the language monitor 5 and the printer 7. Numeral 5 denotes a language monitor which receives the printer command outputted from the printer driver 4 and transmits the command to the printer 7 via the USB port driver 6. The USB port driver 6 transmits the printer command outputted from the language monitor 5 to the printer 7 via a USB port, and when a status is received from the printer 7, the USB port driver 6 outputs the status to the language monitor 5. The printer 7 performs printing in accordance with the printer command received from the USB port driver 6. Note that in the figure, the printer 7 and the host computer 1 are interconnected via a USB interface, however, any other interface may be used. According to circumstances, the printer and the host computer may be interconnected via a network.

Figure 2:
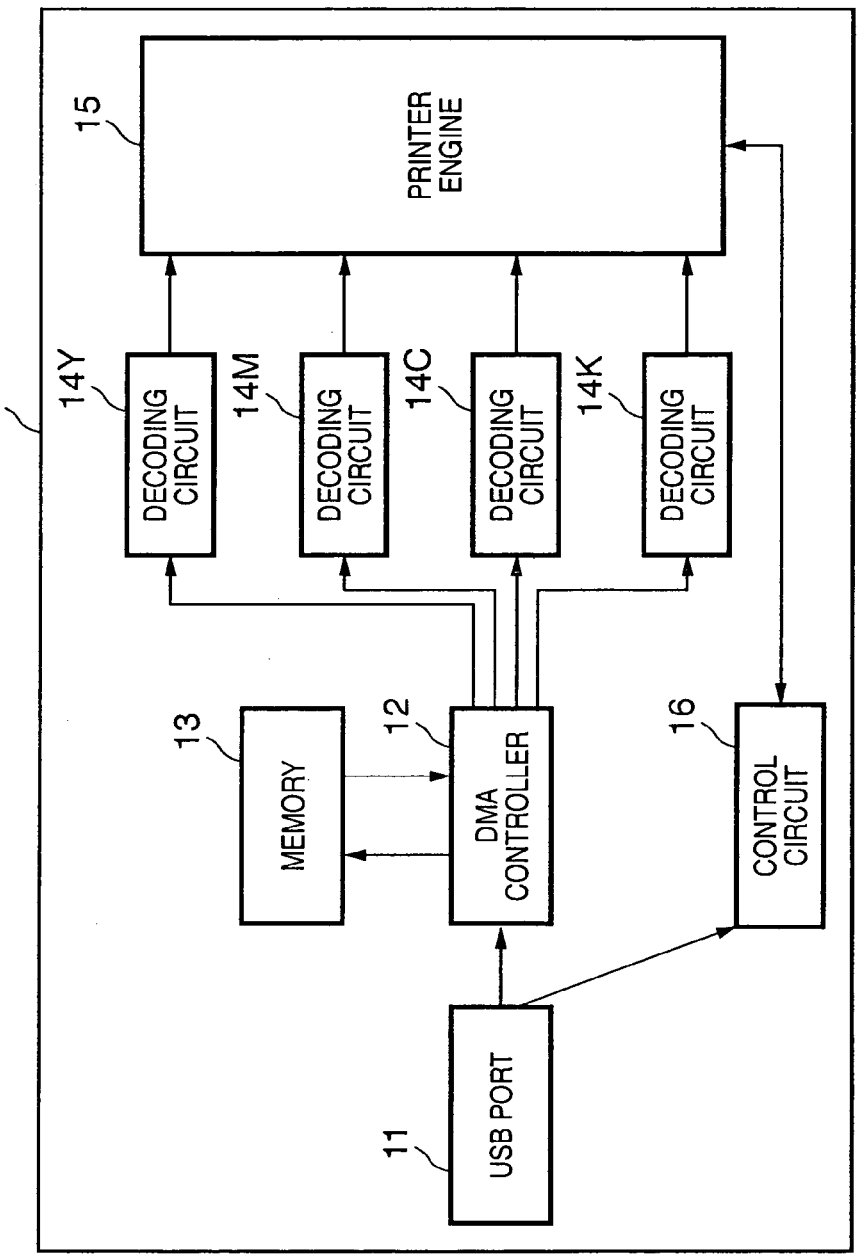
FIG. 2 is a block diagram of a printer according to the first embodiment.

FIG. 2 is a block diagram showing the construction of the printer 7. In FIG. 2, numeral 11 denotes a USB port which receives print data (including printer command) from the computer 1. Note that as described above, the interface connected to the host computer 1 is not limited to the USB interface, but any other interface such as a network interface may be employed.

Numeral 12 denotes a DMA controller which stores image data received via the USB port 11 into a memory 13, and controls transfer of image data, read from the memory 13, to decoding circuits 14Y, 14M, 14C and 14K prepared for respective printing color components (yellow, magenta, cyan and black). Further, the DMA controller 12 utilizes the memory 13 as 4 ring memories to be described later. The memory 13 has a capacity of e.g. 16 M bytes. Image data is stored into or outputted from the memory 13 under the control of the DMA controller 12. The memory 13 is logically divided into 4 channels, and each channel operates as a FIFO (first in first out) memory having e.g. 4 M bytes. The decoding circuits 14Y, 14M, 14C and 14K decode compressed image data stored in the memory 13 and output the data to a printer engine 15. As the decoding circuits are respectively independent circuits, image data on the respective channels can be simultaneously decoded. The printer engine 15 is a laser-beam printer engine which performs printing based on the image data outputted from the decoding circuits 14Y, 14M, 14C and 14K in accordance with an instruction from a control circuit 16. The control circuit 16 is a 1-chip CPU or the like which controls the entire apparatus including the USB port 11, the DMA controller 12, the memory 13, the decoding circuits 14 and the printer engine 15.

Figure 7:
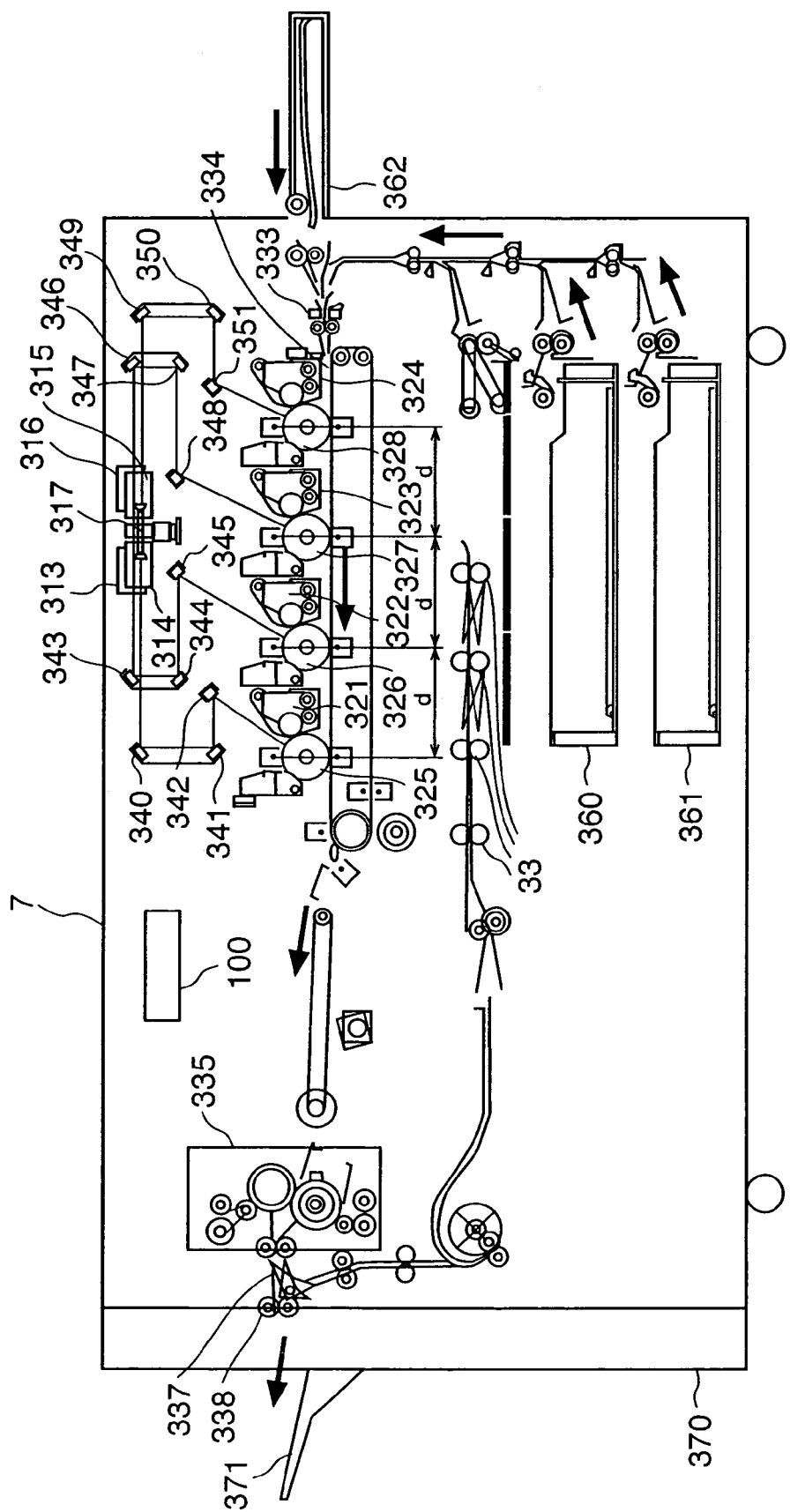
FIG. 7 is a cross-sectional view of the printer for explanation of a printer engine.

FIG. 7 is a cross-sectional view showing the particular structure of the printer engine 15 of the printer 7. The control circuit 16, the memory and other circuits as shown in FIG. 2 are mounted as a printer controller on a printed circuit board 100 in FIG. 7.

Hereinbelow, the structure of the printer engine 15 will be described in detail.

A laser driver 317 drives laser light emitting units 313 to 316 to emit laser light in correspondence with image data outputted from a printer image processor 352 (respectively to form an image of printing color component, by driving based on signals from the decoding circuits 14Y, 14M, 14C and 14K in FIG. 2). The laser light are reflected by mirrors 340 to 351 to electrostatic drums 325 to 328, and latent images in correspondence with the laser light are formed on the electrostatic drums 325 to 328. Numerals 321 to 324 denote developers to develop the latent images with black (Bk), yellow (Y), cyan (C) and magenta (M) toner. The developed respective color toner images are transferred onto a print sheet, thus a full-color printout is obtained. Note that the electrostatic drums 325 to 328 for the respective color components are provided with a predetermined interval d. That is, the decoding circuits 14Y, 14M, 14C and 14K are driven with an offset shifted by timing corresponding to the distance d and a paper transfer speed. Accordingly, the respective decoding circuits can simultaneously decode image data for actually different printing positions.

A print sheet (including an OHP sheet) fed from paper cassettes 360 and 361 or a manual feed tray 362 at timing synchronized with the start of laser irradiation is adsorbed onto a transfer belt 334 via resist rollers 333, and conveyed in an arrow direction in the figure. Then developing materials attached from the electrostatic drums 325 to 328 are transferred onto the print sheet. The print sheet carrying the developing materials is conveyed to a fixer 335, and the developing materials are fixed to the print sheet by heat and pressure from the fixer 335. The print sheet passed through the fixer 335 is discharged by discharge rollers 338. A paper discharge unit 370 performs assortment of discharged print sheets, stapling of assorted print sheets and the like.

Further, in a case where double-sided printing is set, a print sheet is conveyed to the discharge roller 338, then the rotational direction of the discharge rollers 338 is reversed, and at the same time, the turning angle of a flapper 337 is controlled, thereby the print sheet is guided to a re-feed conveyance path 338. The print sheet guided to the re-feed conveyance path 338 is supplied to the transfer belt 334 at the above-described timing.

Note that in the above structure, the printer engine 15 of the present embodiment is capable of print-outputting 1-pixel 2-bit data for respective color components, i.e., printing a 4-level image. As one means for grayscale printing, PWM (pulsewidth modulation) method is employed. Further, for 4-level representation of natural image, dither processing is performed on the host computer side, thereby 1-pixel 2-bit image data is generated. The details will be described below.

The system configuration according to the present embodiment is as described above. Hereinbelow, the characteristic feature of the present embodiment will be described.

Figure 3:
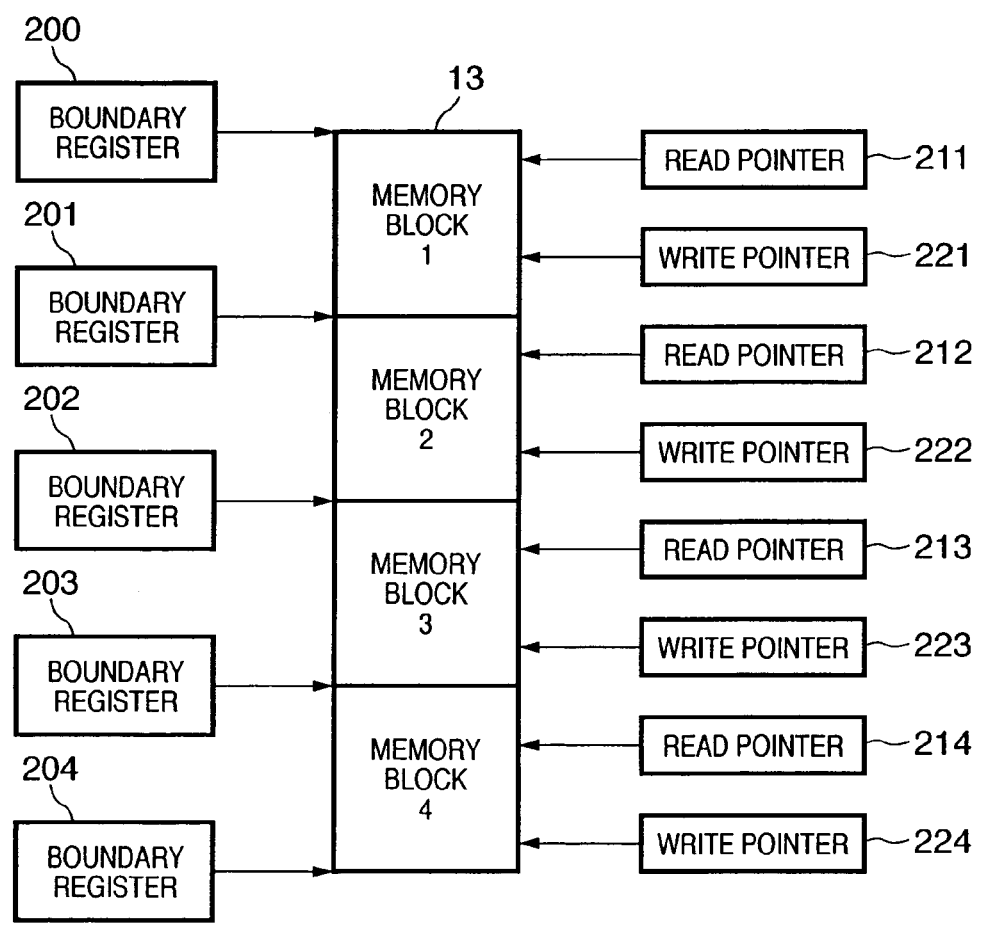
FIG. 3 is a block diagram showing the details of a ring memories of the printer according to the first embodiment.

FIG. 3 is a block diagram showing a ring buffer constituted with the DMA controller 12 and the memory 13 in the printer 7. As shown in FIG. 3, the memory 13 is divided into 4 memory blocks, memory blocks 1 to 4. Numerals 200 to 204 denote boundary registers included in the DMA controller 12, designating respective memory block boundaries. That is, the boundary register 200 designates the head of the memory block 1; the boundary register 201, the end of the memory block 1 and the head of the memory block 2; the boundary register 202, the end of the memory block 2 and the head of the memory block 3; the boundary register 203, the end of the memory block 3 and the head of the memory block 4; and the boundary register 204, the end of the memory block 4.

Numerals 211 to 214 denote read pointers included in the DMA controller 12, respectively holding addresses to read data from the memory blocks 1 to 4, corresponding to the decoding circuits 14Y, 14M, 14C and 14K. Further, the read pointers 211 to 214 are updated by the DMA controller 12 with addresses to read the next data in accordance with sizes of read data.

Numerals 221 to 224 denote write pointers included in the DMA controller 12, respectively holding addresses to write print data from the host computer 1 into the memory blocks 1 to 4. Further, the write pointers 221 to 224 are updated by the DMA controller 12 with addresses to write the next data in accordance with sizes of written data.

In the respective memory blocks 1 to 4, the ring memory is updated, and if the read pointers 211 to 214 or the write pointers 221 to 224 indicate the end of the memory block, the memory block is updated by the DMA controller 12 such that the head address of the memory block is held.

Next, a printing operation according to the present embodiment will be described.

When the operator operates the application 3 (any software may be employed) running on the host computer 1 to generate print data and instructs to print-output the data, a printing command is delivered from the application 3 via the operating system 2 to the printer driver 4. The printer driver 4 converts the data into image data and compresses the data based on the printing command issued from the application 3, and outputs the compressed image data, with a print condition designation command designating a paper size, a line length and the number of lines of bitmap data and an end of page command indicating the end of page.

The outputted printer command is delivered via the operating system 2 to the language monitor 5. The language monitor 5 transfers the received printer command to the printer 7. The printer 7 receives the print condition designation command, then instructs the printer engine 15 to start printing. Further, the printer 7 receives the image data command, and stores image data for each of printing color components into a corresponding memory block in the memory 13 in accordance with a write pointer, and updates the write pointer. The printer engine 15 receives the print instruction, then starts paper feeding, and when the paper has reached a predetermined position, printer engine 15 requests output of image data. When the output of image data is requested, the respective decoding circuits 14 instruct via the DMA controller 12 to read image data stored in one of the memory blocks in the memory 13. The DMA controller 12 receives the request, reads data indicated with the read pointer of corresponding memory block, and outputs the data to the requesting decoding circuit. At this time, the read pointer is updated, and the address space where the data has been read out becomes an available area for storing the following image data. The decoding circuit 14 decodes the data transferred by the DMA controller 12 and outputs the decoded data to the printer engine 15.

Next, the details of the processing of the printer driver (computer program) 4 in the host computer 1 will be described with reference to the flowchart of FIG. 4.

Figure 4:
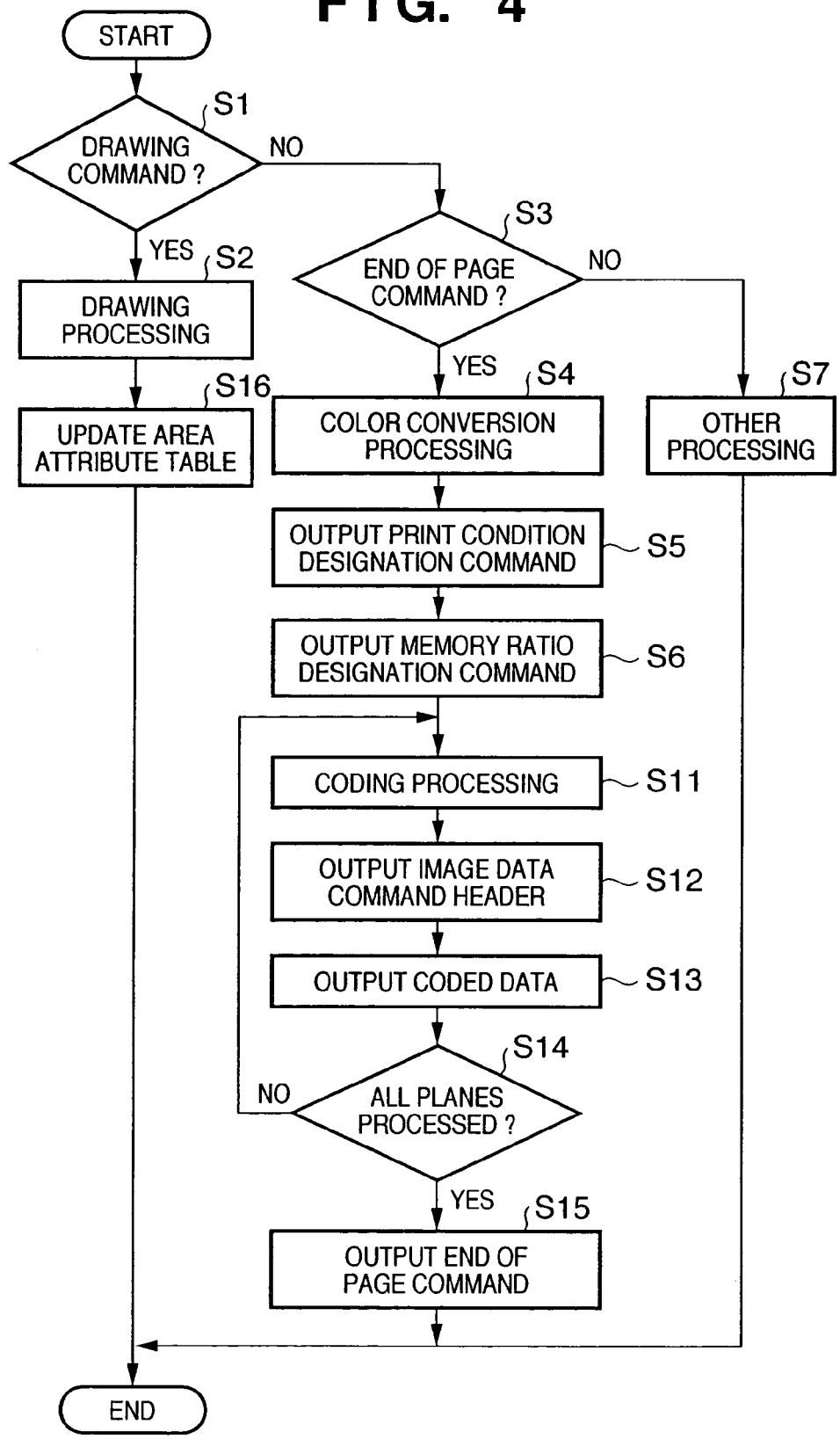
FIG. 4 is a flowchart showing a processing procedure of a printer driver operating on a host computer according to the first embodiment.

FIG. 4 shows processing in a case where one print data is received from the operating system 2 (higher processing than the printer driver). Accordingly, the processing in this figure is repeatedly performed in printing of a general document.

First, at step S1, it is determined whether or not the type of call delivered from the operating system is a drawing command. If it is determined that the call is a drawing command, drawing processing is performed at step S2. For example, when a font type, a font size and a character code have been received, a character pattern is generated in correspondence with the command, or in the case of a halftone image, received image data is drawn in a designated position.

Next, at step S16, an area attribute table indicating the area position of the image drawn at step S2 and the attribute of the area, i.e., character/line art drawing or halftone image drawing, is updated. In a case where a character pattern image is continuously bitmapped, the area size of the area attribute table is updated. Note that the area attribute table is reset upon start of 1 page. When information indicating the end of the 1 page has been received from the operating system 2, the table is referred to, thereby a character/line art area and a halftone image area can be determined.

FIG. 8 shows an example of the area attribute table. As shown in FIG. 8, 1 record includes a coordinate position of the image area (e.g., a rectangular area indicated with information on upper-left corner position, width and height) and information indicating whether the image area is a character/line art or halftone image. "EOT" is a mark indicating that no area follows. As in the case of general document, in mapping of character pattern image data, coordinate positions are often continuous. Accordingly, upon continuous mapping of character pattern image data, increment of table size is prevented by updating the "area position". Further, as a halftone image is an independent image, 1 record is assigned to 1 halftone image. Note that in a case where halftone images continuously exist, increment of the number of records may be suppressed by updating the area position.

As described above, every time 1 drawing unit data is received from the operating system, drawing is performed, and the area attribute table is updated.

On the other hand, at step S1, if the type of call is not a drawing command, the process proceeds to step S3, at which it is determined whether or not the type of call is an end of page command. If the type of call is an end of page command, color conversion processing and quantization processing (reducing the number of quantization) are performed at step S4.

More particularly, first, well-known conversion processing is performed based on the respectively-8-bit red (R), green (G) and blue (B) image drawn at step S2, so as to generate image data of printing color components, a cyan (C), magenta (M), yellow (Y) and black (K) (respectively 8 bits), and the image data of respective printing color components are converted to 2-bit data (quaternarized). The quaternarization processing is made by dither processing. Note that to increase the processing speed, the color conversion and quantization may be realized by using a LUT (look-up table).

At this time, dither matrixes to be used are determined in correspondence with a mode designated by the user upon printing. FIG. 9 shows plural dither matrixes previously held in the printer driver 4. A table to be used is determined in correspondence with a mode set by the user upon print instruction. The respective tables are prepared for printing documents, photographs, graphics including drawings. Further, tables for image-quality oriented printing, compression-ratio oriented printing and the like are prepared.

Further, considering a character/line-art image and a halftone image, sharpness-oriented printing is preferable in the former image, whereas tonality-oriented printing is preferable in the latter image. Accordingly, different dither matrix patterns are used for the character/line-art image and the halftone image. In the case of the character/line-art image, a dot-concentrated type dither matrix or a small-size dither matrix is employed. On the other hand, in the case of the halftone image, a dot-distributed type dither matrix or a large-size dither matrix is employed. In consideration of above situation, in the present embodiment, as shown in FIG. 9, tables are prepared for conceivable modes designed by the user, defining dither matrix patterns for respective color-component character/line-art images and halftone images.

Further, in the respective table, right fields "Axx" indicate image compression ratios in quaternarization with the dither matrixes. The compression ratios are empirically obtained in advance from plural sample images.

Further, upon quaternarization, as a character/line-art area position and a halftone image area position can be determined by referring to the area attribute table (See FIG. 8) updated upon drawing, quaternarization is performed by using dither matrix patterns corresponding to the respective areas. For example, in a case where the table of image quality 1 is selected, an area to be quaternarized is a character/line-art image area and a printing color component is yellow, a yellow dither matrix pattern for character/line-art area is used in quaternarization (conversion to 2-bit data).

Returning to FIG. 2, when the conversion to printing color space. and the quaternarization have been performed as described above, the process proceeds to step S5, at which a print condition designation command is outputted as a command designating necessary conditions for printing, e.g., a paper size, a selected paper-feed source, a resolution, the number of tone levels, the number of bytes in 1-line, and the number of lines in 1 page.

Next, at step S6, compression ratios of the respective color components used at step S4 are calculated, and based on the result of calculation, a memory ratio designation command is outputted.

The compression ratios are predicted based on the dither matrixes used for the areas for the respective color components, determined from the area attribute table in FIG. 8.

For example, in a case where a yellow component image has 2 areas AREA 1 and AREA 2, having area sizes W1 and W2, and the area AREA 1 is a character/line-art image and the area AREA 2 is a halftone image area, a predicted compression coding amount Yratio for the yellow component is calculated as $$Yratio = W1 \times A1 + W2 \times A2$$

The calculation is applied to other color components.

Then, if the ratio of the predicted coding data amount for the color components, cyan, magenta, yellow and black is, e.g.,

5:6:3:2, a command designating the above ratio is issued.

Thereafter, the process proceeds to steps S11 to S13, to output compressed code data for cyan, magenta, yellow, and black color components, with the command.

First, at step S11, in accordance with a predetermined compression procedure, the image data is compression-encoded. Next, at step S12, an image data command header designating the color and size of the image data-encoded at step S11 is outputted. Next, at step S13, the image data encoded at step S11 is outputted. Next, at step S14, it is determined whether or not all the cyan, magenta, yellow and black planes have been processed. If NO, that is, if it is determined that all the color component planes have not been processed, the process returns to step S11, at which processing is performed on the next color plane. Thus, when all the cyan, magenta, yellow and black planes have been processed, the process proceeds from step S14 to step S15, at which a page ejection command designating the end of page is outputted, and the process ends (note that in a case where the last page has been outputted, a job end command is issued).

On the other hand, at step S1, if the type of call is not an end of page command, the process proceeds to step S7, at which other processing corresponding to the type of the data, e.g., page start command or printer capability inquiry command, is performed. Then the process ends.

The series of commands generated as above are delivered via the operating system 2 to the language monitor 5. A communication path from the language monitor 5 to the printer 7 is logically constituted with one command channel and 4 data channels corresponding to cyan, magenta, yellow and black-colors. In each channel, whether or not data transfer can be made is indicated by a "status", a response to a status acquisition command. When the language monitor 5 receives a command, it transmits a status request command via the USB port driver 6 to the printer 7. The printer 7 receives the status request command, and transmits a status.

The status is delivered via the USB port driver 6 to the language monitor 5. The language monitor 5 examines the received status, and transmits a command (data) on a transmission-permitted channel. For example, in a case where transmission on the command channel is permitted and there is an untransmitted command other than the image data command such as a print condition designation command, the untransmitted command is transmitted. Further, in a case where transmission on a data channel corresponding to a black image is permitted and there is an untransmitted black data command, the untransmitted command is transmitted. In this manner, the language monitor 5 performs command transmission while checking the status until all the series of commands have been transmitted.

Note that transmission is not performed such that all the data for one color component is transmitted and then data for the next color component is transmitted. That is, plural color component data are sequentially transmitted in appropriate data amount units.

Figure 5:
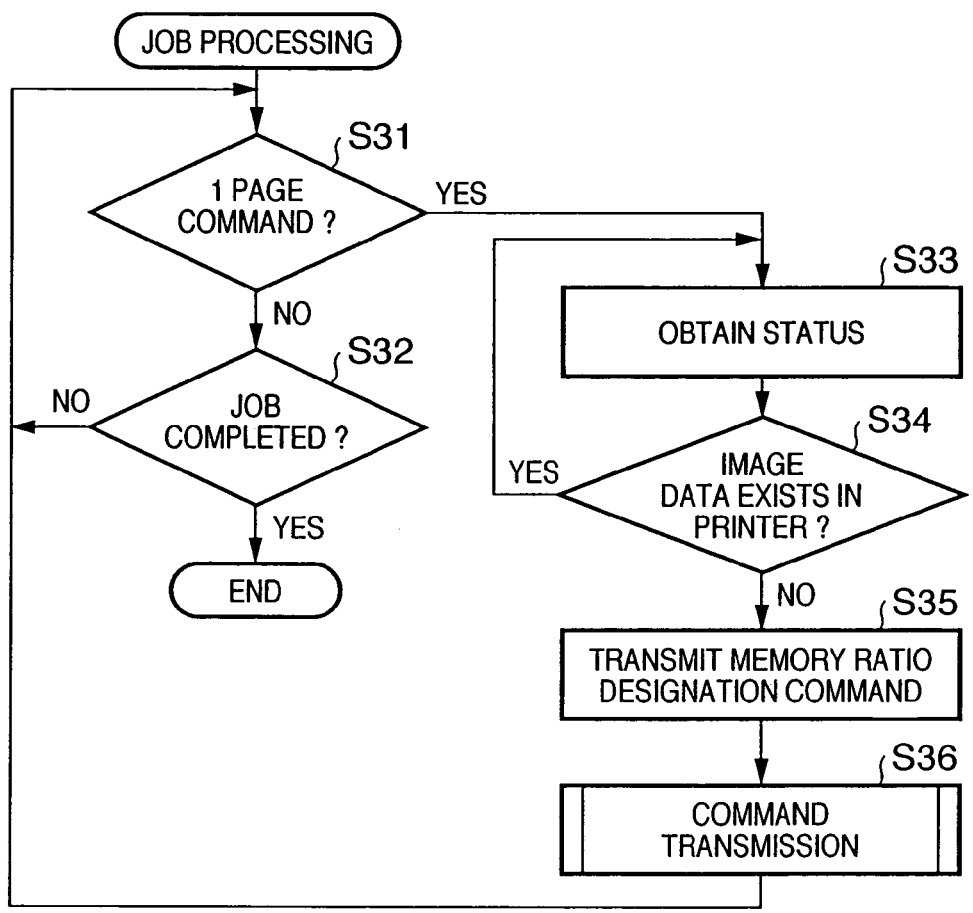
FIG. 5 is a flowchart showing a processing procedure of a language monitor operating on the host computer according to the first embodiment.

Next, a particular example of the processing procedure of the language monitor 5 according to the present embodiment will be described with reference to the flowchart of FIG. 5.

First, at step S31, it is determined whether or not all the series of commands constructing 1 page (including compressed image data,) has been received. If it is determined that all the series of commands has not been received, the process proceeds to step S32 at which it is determined whether the job has been completed or all the commands of the job have been received. If it is determined that all the commands of the job have been received, the process ends, otherwise, the process returns to step S31 to wait for reception of a series of commands constructing 1 page.

If it is determined at step S31 that all the series of commands constructing 1 page has been received, the process proceeds to step S33, at which the status of the printer 7 is requested and obtained. The status of the printer. includes current capacities of the respective memory blocks and sizes of image data stored in the respective memory blocks.

Next, at step S34, it is determined whether or not unprocessed print data exists in any of the memory blocks. If it is determined unprocessed print data exists, the process waits until there is no unprocessed print data. If it is determined that there is no unprocessed print data, the process proceeds to step S35, at which a memory ratio designation command is transmitted, then at step S36, compressed coded data for the respective color components are transmitted. At step S36, all the transmittable compressed data is transmitted for each color component, and when and after a buffer-full state, data for the color component is divided into small data blocks as soon as an available area is obtained, and the small data blocks are uniformly transmitted.

The processing on the host computer side is as described above. Next, the processing on the printer 7 side according to the present embodiment will be described.

Figure 6:
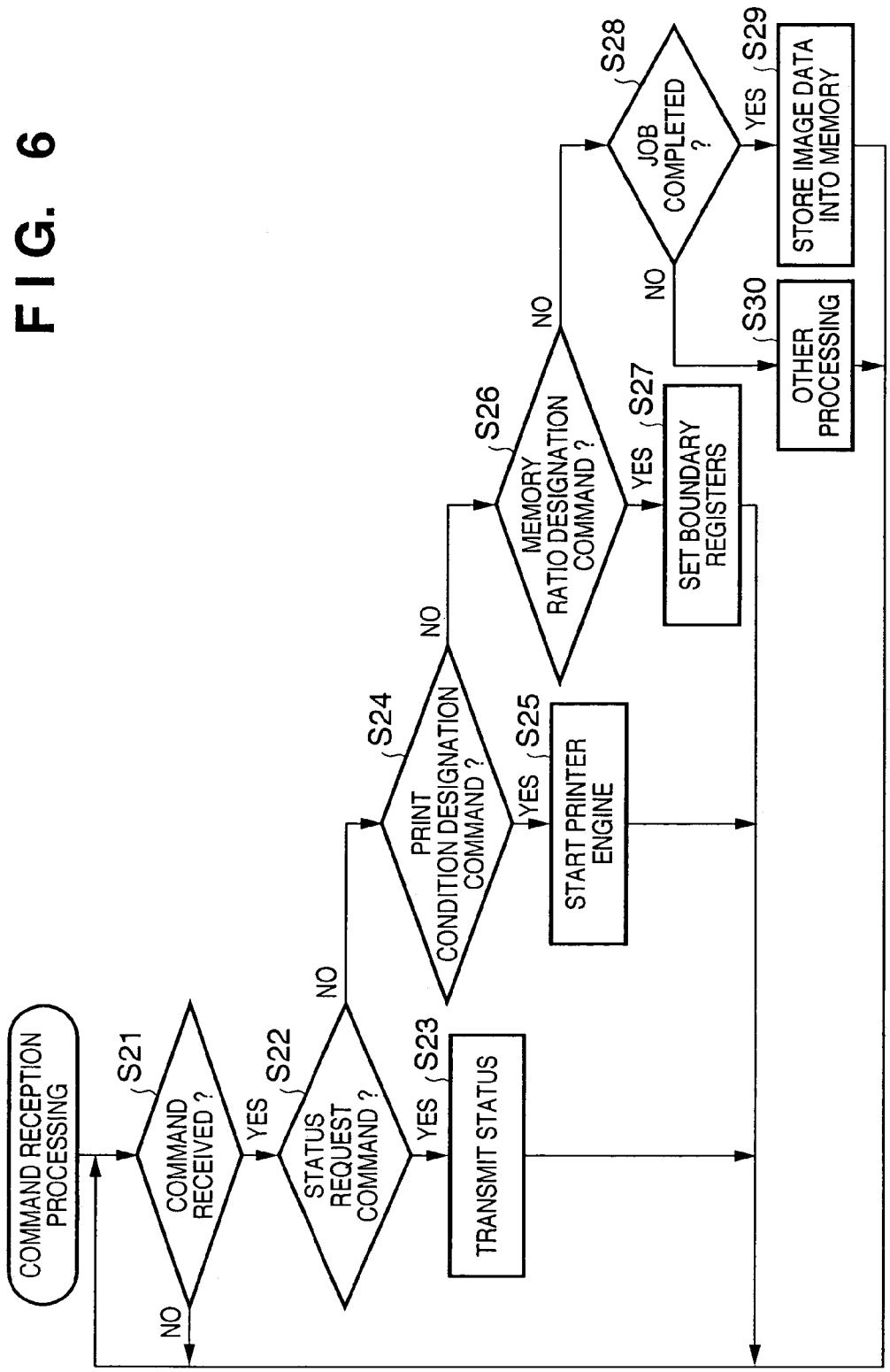
FIG. 6 is a flowchart showing a reception processing procedure in the printer according to the first embodiment.

FIG. 6 is a flowchart showing a processing procedure (mainly reception processing) of the control circuit 16 in the printer 7. Hereinbelow, print processing will be described with reference to FIG. 6.

First, at step S21, it is determined whether or not a command has been received. If it is determined that a command has been received, it is determined at step S22 whether or not the received command is a status request command. If it is determined that the received command is a status request command, the status is transmitted at step S23, and the process returns to step S21.

Further, if it is determined at step S22 that the received command is not a status request command, the process proceeds to step S24, at which it is determined whether or not the received command is a print condition designation command. If it is determined that the received command is a print condition designation command, the process proceeds to step S25, at which the printer engine 15 is instructed to start printing in accordance with the designated printing conditions, and the process returns to step S21. The printing conditions include designation of printing resolution and paper-feed source.

If it is determined at step S24 that the received command is not a print condition designation command, the process proceeds to step S26, at which it is determined whether or not the received command is a memory ratio designation command. If it is determined that the received command is a memory ratio designation command, the process proceeds to step S27, at which memory areas for the respective color components are ensured in accordance with the received memory ratio designation command, and the process returns to step S21. The processing to ensure the memory areas at step S27 is realized by setting the 5 boundary registers 200 to 204. Further, the 4 read pointers 211 to 214 and the 4 write pointers 221 to 224 are initialized.

For example, in a case where the capacity of the memory 13 is 16 M Bytes and the memory ratio for the cyan, magenta, yellow and black colors is designated by the received memory ratio designation command as 5:6:3:2, the boundary register 200 is set to "0H", the boundary register 201 is set to "500000H", the boundary register 202 is set to "0B00000H", the boundary register 203 is set to "0E00000H", and the boundary register 204 is set to "100000H" (H indicates a hexadecimal number) such that the memory block sizes for the respective printing colors are 5 (=16×5/(5+6+3+2)) M bytes, 6 M bytes, 3 M bytes and 2 M bytes. Further, the 4 read pointers 211 to 214 and the 4 write pointers 221 to 224 are set to respective head addresses of corresponding. memory blocks as initial values.

Further, if it is determined at step S26 that the received command is not a memory ratio designation command, the process proceeds to step S28, at which it is determined the received command is a header of an image data command. If it is determined that the received command is a header of an image data command, the process proceeds to step S29, at which the DMA controller 12 is set so as to perform transfer such that image data following the header of the image data command is stored in a memory block corresponding to the color of the image indicated by the header, and the process returns to step S21. The DMA controller 12 reads the image data following the header of the image data command and stores the data into the designated memory block. When one transfer has been completed, the write pointer is updated.

Note that if it is determined at step S28 that the received command is not a header of an image data command, the process proceeds to step S30 to perform other command processing, and returns to step S21.

As described above, when data transfer for the respective printing color components has been performed, the control circuit 16 causes the decoding circuits 14Y, 14M, 14C and 14K to start decoding processing at timings shifted in correspondence with the printing order and the drum interval d at predetermined timing (timing of conveyance of print sheet to a predetermined position). As an available area occurs in the memory blocks for the respective color components, if untrasferred data exists, the host computer 1 can transfer the untransferred data.

As described above, according to the present embodiment, as the memory areas of the memory 13 in the printer are allocated in correspondence with data amounts for the respective color components, printing processing can be performed while maintaining substantially the same storage state for the respective color components. This is particularly advantageous when decoding processing for the respective color components progress simultaneously. In a case where the amount of memory for 1 printing color component is too large and that for another printing color component is too small, no data can be supplied in decoding processing with small memory, thereby normal printing cannot be performed.

However, as described above, in the present embodiment, memory blocks are ensured in accordance with the ratio of coded data sizes for the respective printing color components. In decoding processing, an available area occurs in the respective memory blocks sufficiently before buffer under running, and untransferred data can be transferred. Thus the limited memory can be effectively utilized.

Second Embodiment

In the above embodiment, the printer driver in the host computer predicts the code amounts of respective printing color components for 1 page using predetermined prediction coefficients, and transmits a memory ratio designation command in correspondence with the predicted code amounts. That is, as the code amounts are predicted, the memory ratio can be close to an actual ratio but the accuracy thereof is susceptible to improvement. Hereinbelow, the second embodiment will be described as an example where the memory ratio designation command is generated based on actually-generated code data amounts.

As the apparatus has the same construction as that of the first embodiment, the processing procedure of the printer driver 4 in the host computer 1 and that of the control circuit 16 in the printer 7 will be described.

Figure 10:
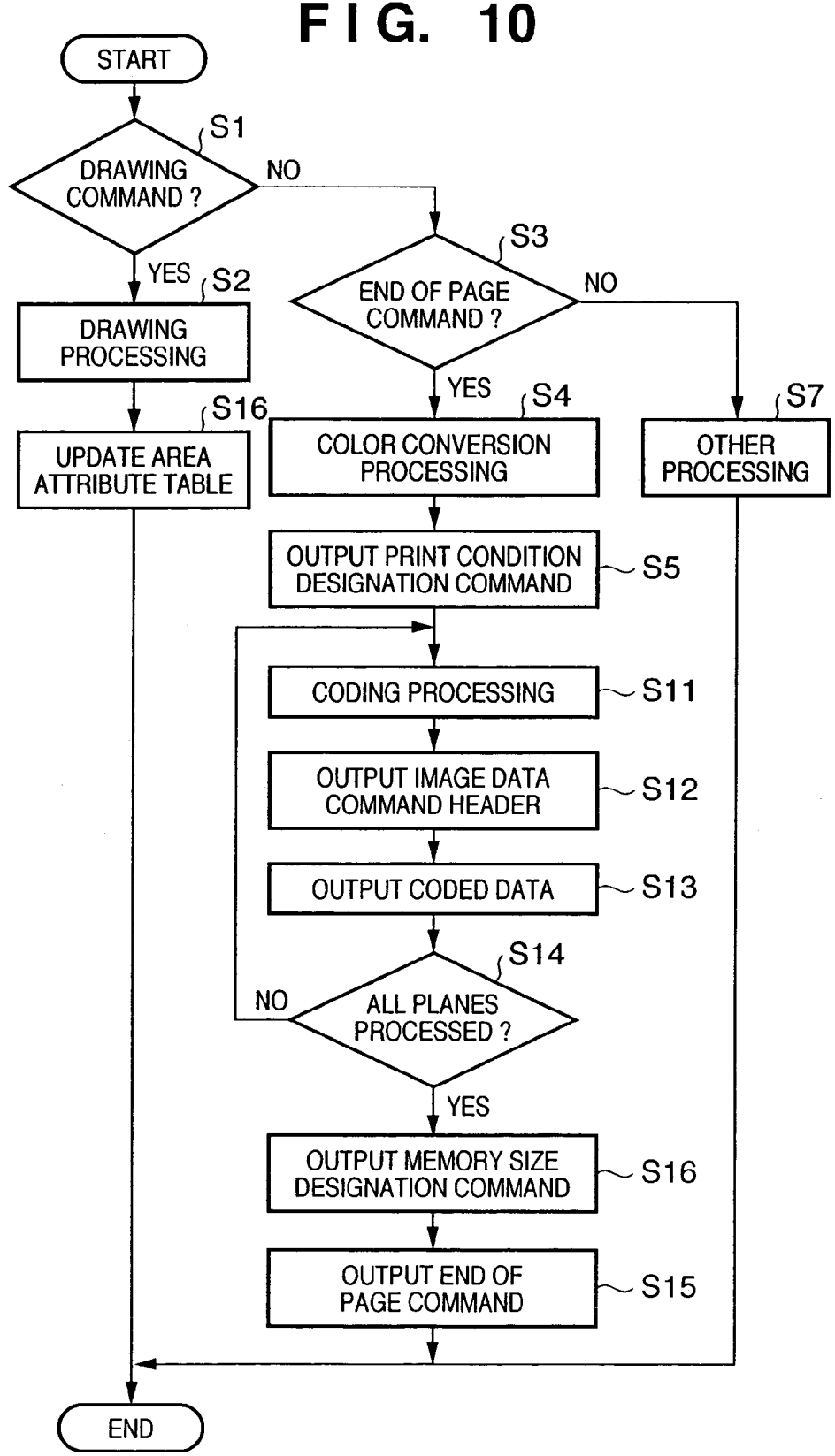
FIG. 10 is a flowchart showing the processing procedure of the printer driver according to a second embodiment.

FIG. 10 is a flowchart showing the processing procedure of the printer driver running on the host computer 1 according to the second embodiment.

The difference from FIG. 4 is that at step S13, when compressed code data is outputted, processing to update counters for the respective printing color components (counting outputted data amounts) is performed, that the output of memory ratio designation command (S16) is performed after the completion of the output of the compressed code data for the respective color components, and that the memory ratio command includes actual data amounts (the numbers of bytes) for the respective color components.

When the output of all the compressed code data for the respective printing color components has been completed and the process has proceeded to step S16, the memory ratio is calculated based on the values held at the counters for the respective printing colors, and the memory ratio designation command is outputted. As the other-steps are the same as those in FIG. 4, the explanations thereof will be omitted.

Figure 11:
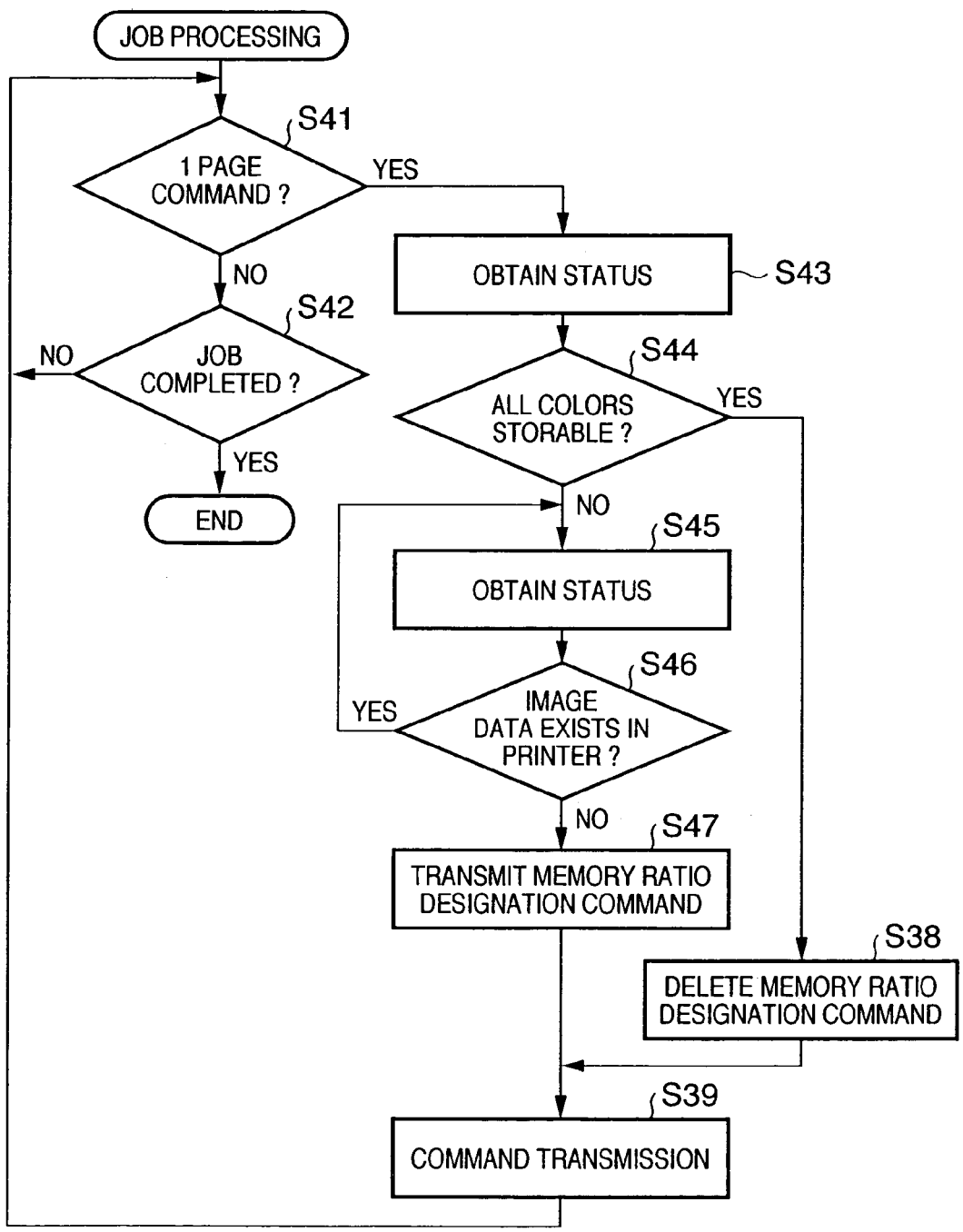
FIG. 11 is a flowchart showing the processing procedure of the language monitor according to the second embodiment.

Next, the details of the processing of the language monitor 5 according to the second embodiment will be described with reference to the flowchart of FIG. 11. Since the flowchart has plural differences from FIG. 5, the description will be made from the start.

When the job is started, first, at step S41, it is determined whether or not a series of commands constructing 1 page has been received. If it is determined that a series of commands constructing 1 page has not been received, the process proceeds to step S42, at which it is determined whether or not the job has been completed, i.e., whether or not all the commands of the job have been received. If it is determined that all the commands of the job have been received, the process ends, otherwise, returns to step S41 to wait for the reception of a series of commands constructing 1 page.

Further, if it is determined at step S41 that a series of commands constructing 1 page has been received, the process proceeds to step S43, at which a printer status is obtained. The printer status includes current capacities of the respective memory blocks and sizes of image data stored in the respective memory blocks.

Next, at step S44, it is determined based on the obtained status whether or not all the image data for the respective colors can be stored in the current memory blocks. More particularly, it is determined whether or not image data sizes for the respective color components designated with the memory size designation command by the above-described printer driver are less than available areas for the respective color components (including printing-completed areas) indicated in the printer status.

If it is determined that all the data for the respective color components can be stored, the storage of the data to be transmitted can be ensured even if the current memory allocation ratio in the memory 13 is maintained (not changed). In other words, during printing, even if unprocessed data remains in the memory 13, as the transmission of the next page data is ensured, the process proceeds from step S44 to step S48 (skips steps S45 to S47), at which the memory size designation command is deleted, then at step S49, a command including compressed image data for the respective color components is transmitted.

On the other hand, if it is determined at step S44 that the available areas are insufficient to store all the data for the respective color components, the acquisition of status indicating no print data is waited at steps S45 and S46. When a status indicating no print data is received, the process proceeds to step S47, at which the memory ratio designation command is transmitted, and at step S49, the command including compressed image data for the respective color components is transmitted.

Note that in the case of the second embodiment, it may be arranged such that the respective read pointers and writer pointers to the memory 13 in the printer 7 are reset only upon reception of the memory ratio designation command.

As described above, according to the second embodiment, the same advantages as those of the first embodiment can be obtained, and further, the following advantages can be expected.

1. The memory 13 of the printer 7 can be allocated to the respective color components with high accuracy, thereby the memory use efficiency can be improved.
2. When printing of a page is performed and unprocessed data (undecoded data) exists in the memory, if the next page data can be stored, the next page data is transmitted without memory allocation, thereby the throughput can be improved.

Note that in the second embodiment, the memory ratio is determined on the host computer side, however, it may be arranged such that data amount information for the respective color components is notified to the printer and the memory ratio is determined on the printer side based on the received information. Further, as the timing of image data output, the next data transmission is performed based on the absence of undecoded data as a trigger, however, the next data may be outputted based on the completion of decoding of previous-page image data (completion of output) as a trigger.

Further, when the respectively 8-bit color component data are converted to smaller number bit data on the host computer side, the dither method is utilized. However, the conversion may be performed by utilizing any other method such as an error diffusion method. In the case of error diffusion method, error diffusion coefficients and a matrix size used upon error diffusion are changed, so that they can be handled as in the case of the dither matrixes.

Further, the printer 7 of the first and second embodiments prints a 4-level (1-pixel 2-bit) grayscale image, however, the printable number of tone levels is not limited to 4 but any number of levels may be employed. Similarly, the quantization on the host computer 1 side is not limited to the quaternarization, further, conversion to smaller-number-bit data is not necessarily performed. Note that as the printing resolution in recent printers is very high, area tone representation with plural dots is efficient and data amount can be reduced in comparison with multilevel density representation of 1 dot. Accordingly, as described in the embodiments, it is preferable to reduce the number of bits for 1 printing color component.

Further, in the embodiments, the printer engine in a laser beam printer is used, however, the present invention is applicable to an inkjet type printer. For example, the present invention can be applied to an apparatus where full-line heads having an array of discharge nozzles for 1 scan line are provided in correspondence with the number of printing color components.

Further, in the second embodiment, before output of the memory ratio designation command, the language monitor checks whether or not no image data exists in the memory. However, it may be arranged such that the language monitor outputs the command without checking, and the printer suspends update of the memory block capacities while notifying a status prohibiting transmission of image data until there is no image data in the memory.

Further, as it is understood from the above embodiments, the processing of the printer driver 4 and that of the language monitor 5 constitute the present invention. As the computer program corresponding to the language monitor 5 is also a part of a general printer driver, a computer program constituted with the printer driver 4 and the language monitor 5 can be regarded as a printer driver program. Further, generally, the printer driver is copied or installed into the system from a portable computer-readable storage medium set in the computer. Accordingly, the present invention includes the computer and the computer-readable storage medium in its scope.

As described above, according to the present invention, upon transmission of compressed code data for respective printing color components from an information processing apparatus such as a host computer to a printing apparatus, a reception buffer memory of the printing apparatus can be effectively utilized.

As many apparently widely different embodiments of the present invention can be made without departing from the spirit and scope thereof, it is to be understood that the invention is not limited to the specific embodiments thereof except as defined in the appended claims.

What is claimed is:

1. A printing system including an information processing apparatus which outputs print data and a printing apparatus which receives the print data from said information processing apparatus and prints a color image on a sheet, wherein said information processing apparatus comprises:
a storage unit configured to store a plurality of tables for defining a set of dither matrix patterns used for character/line image and halftone image for each color component;
a designation unit configured to designate a table among the plurality of tables;
a generation unit configured to generate image data for respective printing color components of an image based on data to be print-outputted delivered from higher processing and quantizing the generated image data for respective printing color components using dither matrixes specified by the table designated by said designation unit;
a coding unit configured to compress-encode the quantized image data for the respective printing color components generated by said generation unit;
a notification unit configured to predict coded color data amounts for the respective printing color components based on the table designated by said designation unit and the sizes of halftone image areas and character/line image areas included in the respective printing color components, generating memory allocation ratio information based on a ratio of the predicted coded color data amounts for the respective printing color components coded by said coding unit and notifying said printing apparatus of the memory allocation ratio information so that said printing apparatus allocates memory areas for respective color components; and
an output unit configured to, after said notification unit notifies said printing apparatus of the memory allocation ratio information, output the coded image data of the respective printing color components coded by said coding unit to said printing apparatus,
and wherein said printing apparatus comprises:
a reception buffer;
a memory allocation unit configured to receive the memory allocation information notified by said notification unit and allocating, in accordance with the received memory allocation ratio information, memory areas for respective color components in the reception buffer so that the memory sizes of each memory areas correspond to ratios of the predicted coded color data amounts for the respective printing color components;
a receiving unit configured to, after said memory allocation unit allocates memory areas, receive coded image data for respective color components and storing the received coded image data of respective color components into respective allocated memory areas;
plural decoding units, independently provided for the respective printing color components, configured to decode coded color data stored in the memory areas to image data; and
a printing unit configured to print the image data for respective color components decoded by said plural decoding units on a sheet.

2. The printing system according to claim 1, wherein respective areas of said reception buffer allocated for the respective printing color components are utilized as a ring buffer.

3. A printing system including an information processing apparatus which outputs print data and a printing apparatus which receives the print data from said information processing apparatus and prints a color image on a sheet,
wherein said information processing apparatus comprises:
a storage unit configured to store a plurality of tables for defining a set of dither matrix patterns used for character/line image and halftone image for each color component;
a designation unit configured to designate a table among the plurality of tables;
a generation unit configured to generate image data for respective printing color components of an image based on data to be print-outputted delivered from higher processing and quantizing the generated image data for respective printing color components using dither matrixes specified by the table designated by said designation unit;
a coding unit configured to compress-encode the quantized image data for the respective printing color components generated by said generation unit;
a notification unit configured to calculate code color data amounts for the respective printing color components by counting data amounts of quantized halftone image areas and character/line image areas for the respective printing color components in accordance with the table designated by said designation unit, generating memory allocation ratio information based on a ratio of the calculated coded color data amounts for the respective printing color components and notifying said printing apparatus of the memory allocation ratio information so that said printing apparatus allocates memory area for respective color components; and
an output configured to, after said notification unit notifies said printing apparatus of the memory allocation ratio information, output the coded image data of the respective printing color components coded by said coding unit to said printing apparatus,
and wherein said printing apparatus comprises:
a reception buffer;
a memory allocation unit configured to receive the memory allocation information notified by said notification unit and allocating, in accordance with the received memory allocation ratio information, memory areas for respective color components in the reception buffer so that the memory sizes of each memory areas correspond to ratios of the calculated coded color data amounts for the respective printing color components;
a receiving unit configured to, after said memory allocation unit allocates memory areas, receive coded image data for respective color components and storing the received coded image data of respective color components into respective allocated memory areas;
plural decoding units, independently provided for the respective printing color components, configured to decode coded color data stored in the memory areas to image data; and
a printing unit configured to print the image data for respective color components decoded by said plural decoding units on a sheet.

4. The printing system according to claim 3, wherein said information processing apparatus further comprises:
a request unit configured to request status information of said reception buffer to said printing apparatus;
a determination unit configured to determine whether or not next page compressed data for the respective printing color components can be stored in available areas of the reception buffer for the respective printing color components, based on the status information obtained by said request unit; and
a control unit configured to, if said determination unit determine that the next page compressed data can be stored, delete the memory allocation ratio information to be notified by said notification unit and causing said output unit to output the next page of compressed data.

5. An information processing apparatus, which is connectable to a printing apparatus in which sizes of reception buffer memory allocated for respective color components are changed in accordance with external instruction information, and which outputs print data to said printing apparatus, comprising:

a storage unit configured to store a plurality of tables for defining a set of dither matrix patterns used for character/line image and halftone image for each color component;

a designation unit configured to designate a table among the plurality of tables;

a generation unit configured to generate image data for respective printing color components of an image based on data to be print-outputted delivered from higher processing and quantizing the generated image data for respective printing color components using dither matrixes specified by the table designated by said designation unit;

a coding unit configured to compress-encode the quantized image data for the respective printing color components generated by said generation unit;

a notification unit configured to predict coded color data amounts for the respective printing color components based on the table designated by said designation unit and the sizes of halftone image areas and character/line image areas included in the respective printing color components, generating memory allocation ratio information based on a ratio of the predicted coded color data amounts for the respective printing color components coded by said coding unit and notifying said printing apparatus of the memory allocation ratio information so that said printing apparatus allocates memory areas for respective color components; and an output unit configured to, after said notification unit notifies said printing apparatus of the memory allocation ratio information, output the coded image data of the respective printing color components coded by said coding unit to said printing apparatus.

6. An information processing apparatus, which is connectable to a printing apparatus in which sizes of reception buffer memory allocated for respective color components are changed in accordance with external instruction information, and which outputs print data to said printing apparatus, comprising:

a storage unit configured to store a plurality of tables for defining a set of dither matrix patterns used for character/line image and halftone image for each color component;

a designation unit configured to designate a table among the plurality of tables;

a generation unit configured to generate image data for respective printing color components of an image based on data to be print-outputted delivered from higher processing and quantizing the generated image data for respective printing color components using dither matrixes specified by the table designated by said designation unit;

a coding unit configured to compress-encode the quantized image data for the respective printing color components generated by said generation unit;

a notification unit configured to calculate coded color data amounts for the respective printing color components by counting data amounts of quantized halftone image areas and character/line image areas for the respective printing color components in accordance with the table designated by said designation unit, generating memory allocation ratio information based on a ratio of the calculated coded color data amounts for the respective printing color components and said printing apparatus of notifying the memory allocation ratio information so that said printing apparatus allocates memory area for respective color components; and an output unit configured to, after said notification unit notifies said printing apparatus of the memory allocation ratio information, output the coded image data for the respective printing color components coded by said coding unit to said printing apparatus.

7. The information processing apparatus according to claim 6, further comprising:

a request unit configured to request status information of said reception buffer to said printing apparatus;

a determination unit configured to determine whether or not next page compressed data for the respective printing color components can be stored in available areas of the reception buffer for the respective printing color components, based on the status information obtained by said request unit; and a control unit configured to, if said determination unit determine that the next page compressed data can be stored, delete the memory allocation ratio information to be notified by said notification unit and causing said output unit to output the next page of compressed data.

8. A control method for an information processing apparatus, which is connectable to a printing apparatus in which sizes of reception buffer memory allocated for respective color components are changed in accordance with external instruction information, and which outputs print data to the printing apparatus, said method comprising:

a storing step of storing a plurality of tables for defining a set of dither matrix patterns used for character/line image and halftone image for each color component;

a designation step of designating a table among the plurality of tables;

a generation step of generating image data for respective printing color components of an image based on data to be print-outputted delivered from higher processing and quantizing the generated image data for respective printing color components using dither matrixes specified by the table designated in said designation step;

a coding step of compress-encoding the quantized image data for the respective printing color components generated in said generation step;

a notification step of predicting coded color data amounts for the respective printing color components based on the table designated in said designation step and the sizes of halftone image areas and character/line image areas included in the respective printing color components, generating memory allocation ratio information based on a ratio of the predicted coded color data amounts for the respective printing color components coded in said coding step and notifying the printing apparatus of the memory allocation ratio information so that said printing apparatus allocates memory area for respective color components; and an output step for, after said notification step notifies said printing apparatus of the memory allocation ration information, outputting the coded image data for the respective printing color components coded in said coding step to the printing apparatus.

9. A computer-readable medium that stores a computer program for causing a computer to implement the method recited in claim 8.

* * * * *